United States Patent [19]

Hamaue

[11] Patent Number: 5,087,075
[45] Date of Patent: Feb. 11, 1992

[54] SEAT BELT SYSTEM
[75] Inventor: Tetsuya Hamaue, Shiga, Japan
[73] Assignee: Takata Corporation, Tokyo, Japan
[21] Appl. No.: 605,322
[22] Filed: Oct. 30, 1990
[30] Foreign Application Priority Data
Nov. 13, 1989 [JP] Japan .................................. 1-294278
[51] Int. Cl.$^5$ .............................................. B60R 22/34
[52] U.S. Cl. .................... 280/806; 280/807; 242/107
[58] Field of Search ............... 280/801, 806, 807, 808; 242/107

[56] References Cited

U.S. PATENT DOCUMENTS

| | | | |
|---|---|---|---|
| 4,198,011 | 4/1980 | Kamijo et al. | 280/807 |
| 4,384,735 | 5/1983 | Maeda et al. | 280/807 |
| 4,487,381 | 12/1984 | Kubota | 242/107 |
| 4,494,709 | 1/1985 | Takada | 280/807 |
| 4,659,108 | 4/1987 | Sack et al. | 280/807 |
| 4,741,556 | 5/1988 | Nagashima | 280/807 |
| 4,807,715 | 2/1989 | Nagashima et al. | 280/807 |
| 4,896,844 | 1/1990 | Gavagan et al. | 280/807 |
| 4,919,450 | 4/1990 | Doty et al. | 280/807 |
| 4,943,011 | 7/1990 | Kitamura et al. | 242/107 |
| 4,966,394 | 10/1990 | Thomas et al. | 280/807 |

FOREIGN PATENT DOCUMENTS 0085396 8/1983 European Pat. Off. .

Primary Examiner—Kenneth R. Rice
Assistant Examiner—Tamara L. Finlay
Attorney, Agent, or Firm—Kanesaka and Takeuchi

[57] ABSTRACT

A seat belt system for protecting and binding an occupant inside a vehicle which comprises an emergency locking seat belt retractor which can be selectively set to be in a tensile force giving mode to give tensile force to a seat belt or in a tensile force cancel mode to cancel the tensile force and a seat movement detector, characterized in that according to a signal from the seat movement detector, the emergency lock system seat belt retractor is for a time in the tensile force giving mode and after a predetermined length of time, said emergency locking seat belt retractor is in the tensile force cancel mode with an appropriate slack of the seat belt.

2 Claims, 9 Drawing Sheets

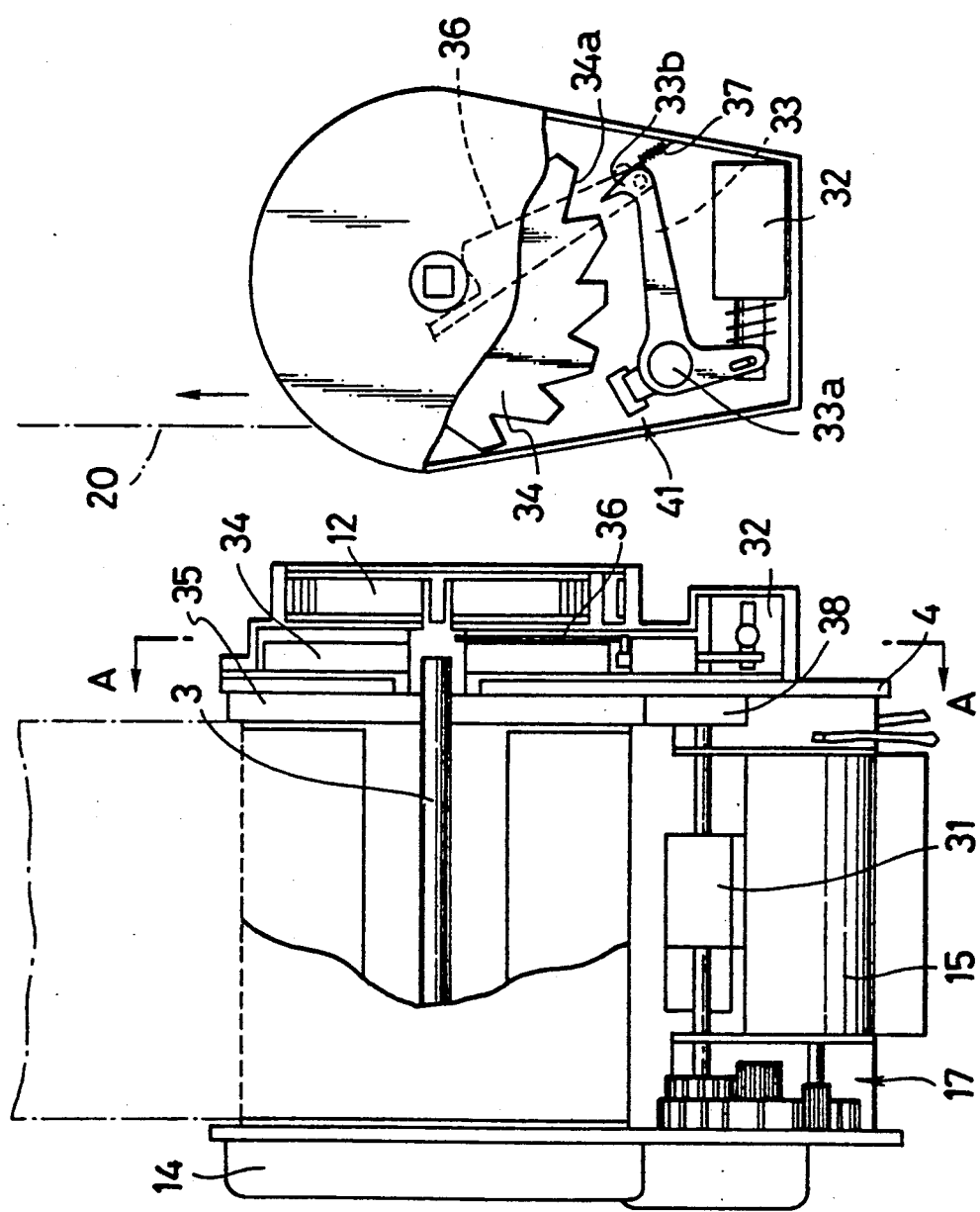

SEAT BELT SYSTEM

FIELD OF THE INVENTION AND RELATED ART STATEMENT

The present invention relates to a seat belt system for protecting and binding an occupant in a vehicle, and particularly, to a seat belt system wherein tensile force of a seat belt can be controlled by a signal from a seat.

A car, etc. are provided with a seat belt which can protect an occupant from suffering a secondary collision (a collision of an occupant to the vehicle by the operation of inertia) in the vehicle by binding the body of the occupant to his seat in an emergency such as at a collision.

When an occupant is bound by such a seat belt, the effect of the binding is lowered if the seat belt is not fastened so closely to the occupant. This is because the more the seat belt is loosely fastened to the occupant, the more the moving distance of the occupant increase, that is, difference in velocity between the occupant and the increases.

On the other hand, some occupants feel uncomfortable if their bodies are all the time bound by the seat belts.

In order to eliminate this feeling of uncomfortableness, a seat belt retractor has been proposed which releases the tensile force of a seat belt so as not to press the body of an occupant in a normal fastened state.

This state in which tensile force of a seat belt is released (hereinafter also referred to as tensionless) is set by unwinding a seat belt for a predetermined length by a seat belt retractor after fastening the seat belt to the body of an occupant who takes the seat.

Accordingly, a seat belt retractor in which this tensionless mode can be set can eliminate a pressed feeling caused by a seat belt without lowering the binding performance.

However, when a seat belt is fastened to the body of an occupant as abovementioned, the tensionless state is set by applying the seat belt to the body of the occupant with the seat and from the sitting posture of the occupant in one state the seat belt is unwound for a predetermined length no matter how the condition of the seat is and no matter how the sitting posture of the occupant is.

Accordingly, after the tensionless state is set, if the occupant does action, for example, bends the seat back, slides the seat backward, or moves the body of himself to the seat back from a forward-bent posture, an abnormal slug (the state of a seat belt with tensile force cancelled and with the seat belt unwound by more than a necessary length) occurs in the seat belt. So, a serious problem that lowering of the binding effect can not be avoided remained unsolved.

OBJECT AND SUMMARY OF THE INVENTION

The object of the present invention is to provide a seat belt system provided with a tensionless function which always gives an appropriate slack and does not cause an excessive slug.

In order to attain the above object, the present invention comprises an emergency locking seat belt retractor which can selectively set tensile force giving mode in which tensile force is given to the seat belt or tensile force cancel mode in which the tensile force is cancelled and a seat detection means which detects sliding movement of a seat, change in the angle of the reclining seat, or change in seating posture of an occupant, characterized in that by a signal from the seat detection means, the emergency locking seat belt retractor is for a time made to be in tensile force giving mode, and after a predetermined time, the emergency locking seat belt retractor is made to be in tensile force cancel mode with an appropriate slack.

The operation of the present invention comprising the above structure is hereinafter described.

After displacement of the seat or change in seating posture of an occupant is detected by the seat detection means, a signal is generated from the seat detection means. According to the signal, the emergency locking seat belt retractor is made to be in tensile force giving mode for a time. After tensile force is given to the seat belt, the seat belt fits on to the body of the occupant, and an abnormal slug is eliminated. Then the seat belt is unwound by a predetermined amount from the emergency locking seat belt retractor and in this state the tensile force of the seat belt is released.

BRIEF DESCRIPTION OF THE DRAWINGS

FIG. 8A is a front view, with portions broken away, of an emergency locking seat belt retractor of a seat belt system as another embodiment;

FIG. 8B is an end view taken along the line A—A of FIG. 8A; and

FIG. 8C is an explanatory view of a tensionless state.

DESCRIPTION OF THE PREFERRED EMBODIMENTS

The present invention is hereinafter described with reference to the drawings.

Figure 1A:
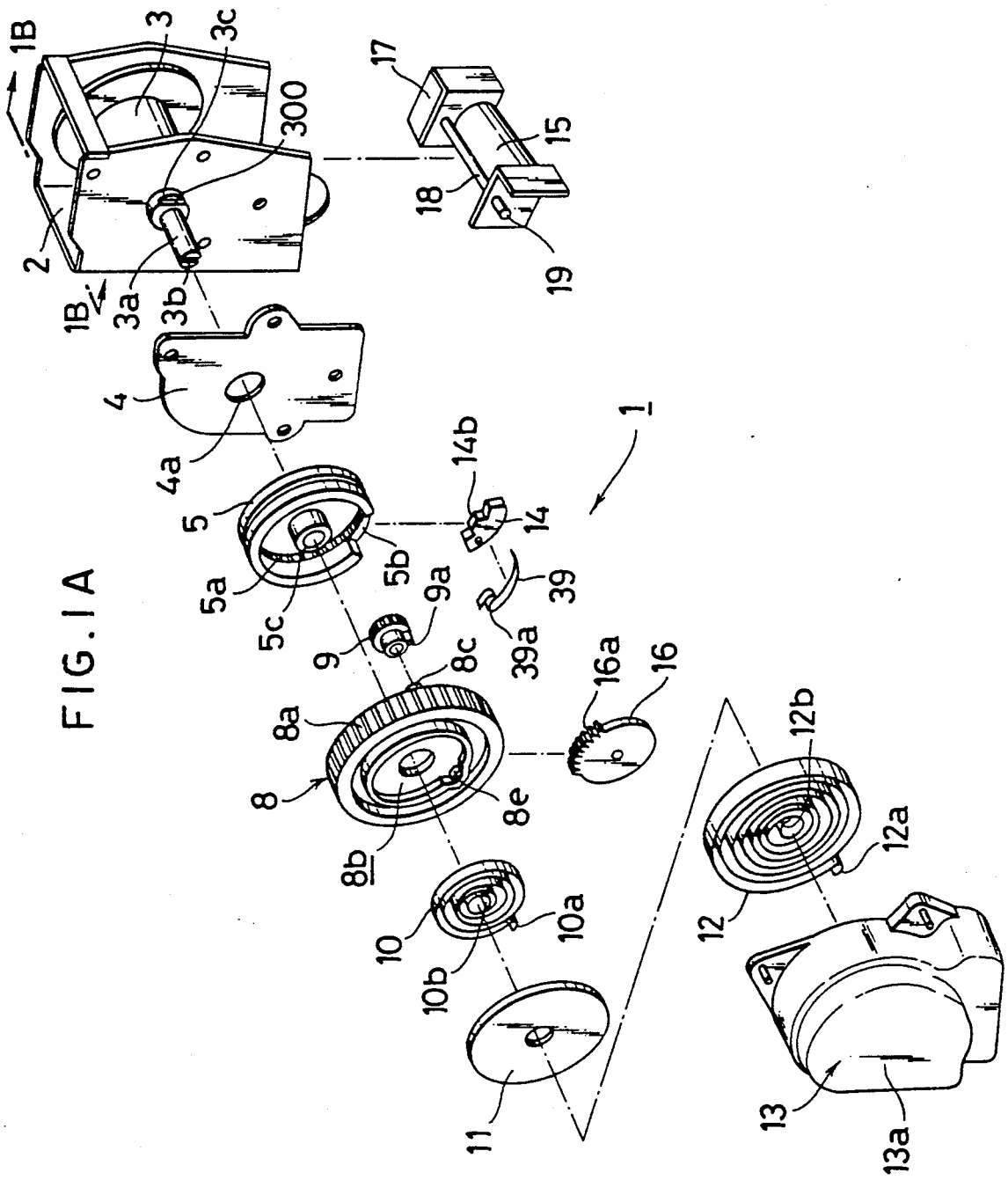
FIG. 1A is an exploded perspective view of mainly a mechanical system of a seat belt system as an embodiment of the present invention.
Figure 1B:
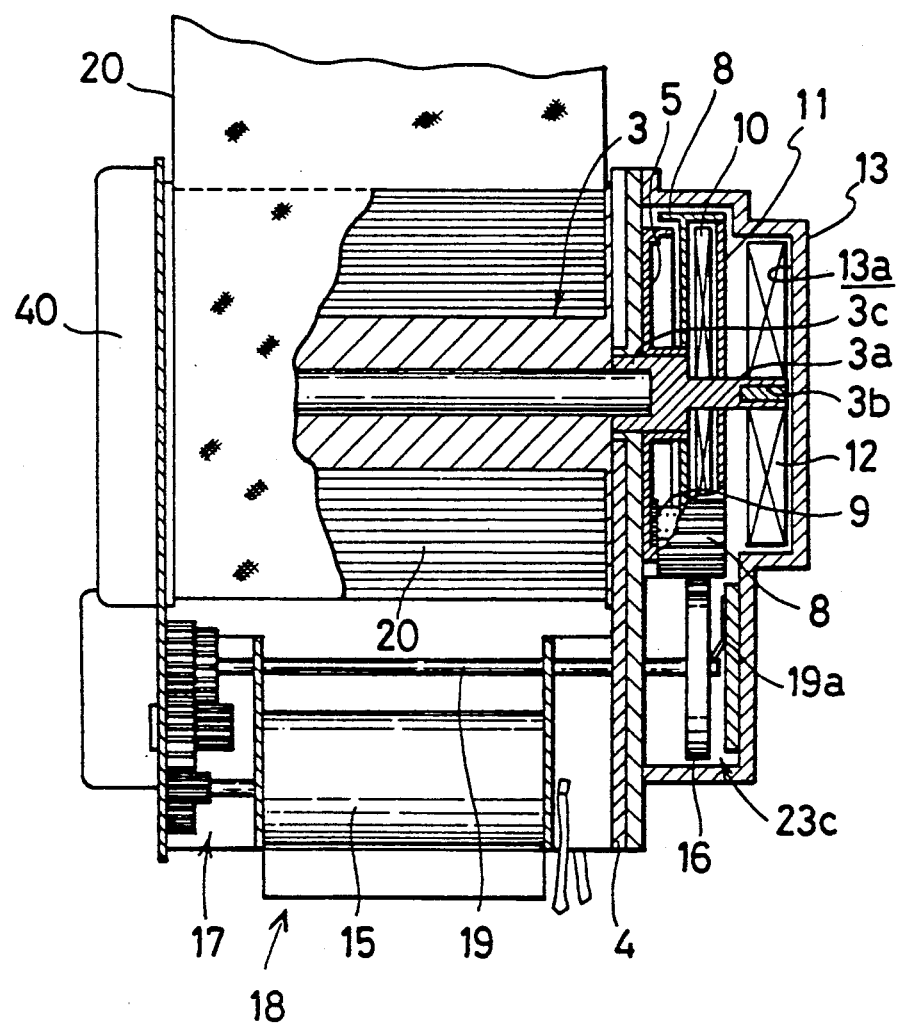
FIG. 1B is a front view of the system, with portions broken away, taken along the line 1B—1B of FIG. 1A in an assembled state.
Figure 2A:
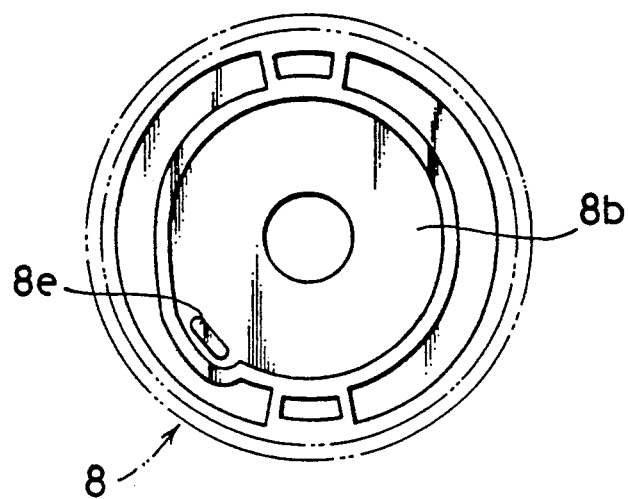
FIG. 2A is a front view of a gear hold.
Figure 2B:
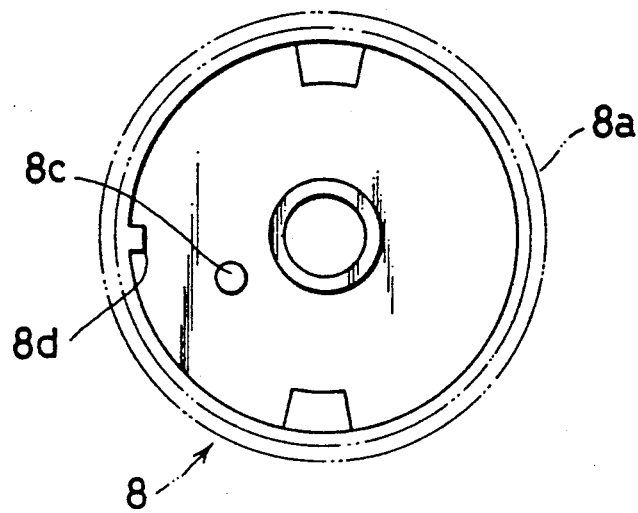
FIG. 2B is a rear view of the gear hold.
Figure 3:
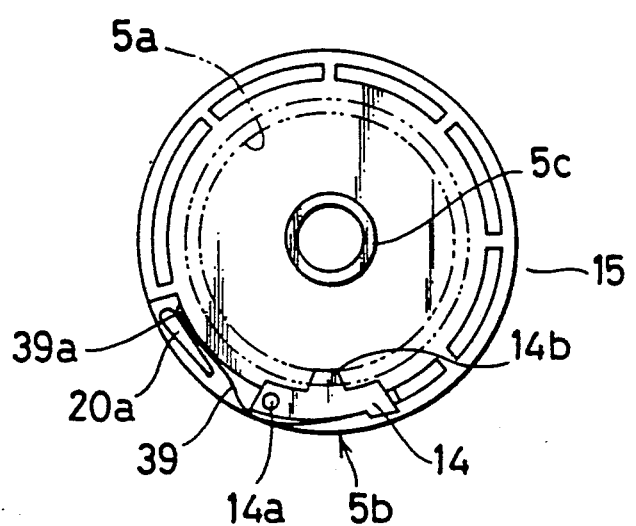
FIG. 3 is an explanatory view of a gear plate.
Figure 4:
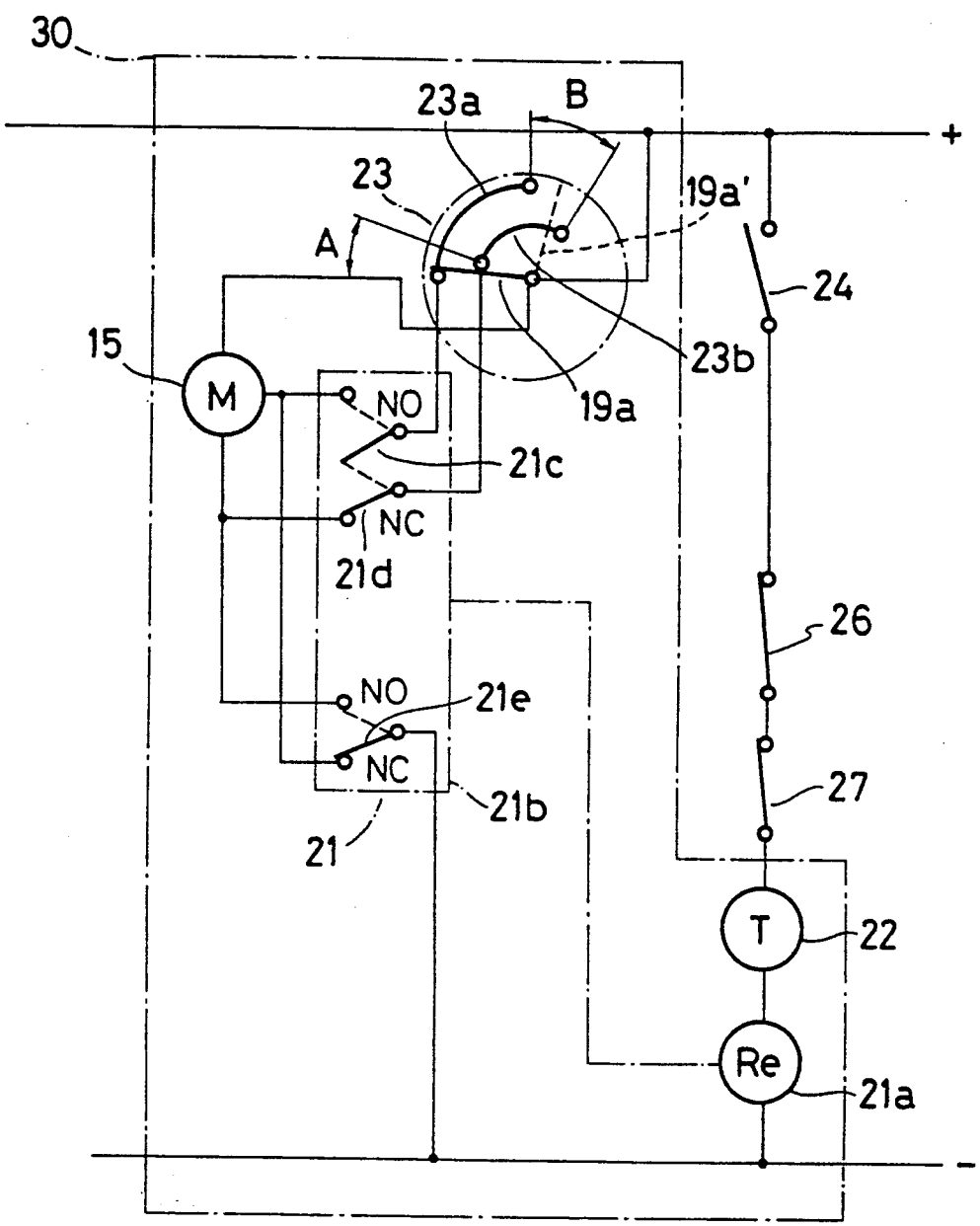
FIG. 4 is a circuit diagram of mainly an electric system of the seat belt system.
Figures 5A, 5B:
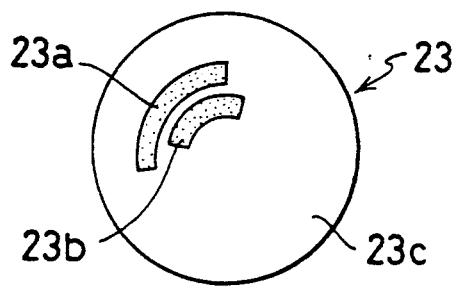
FIG. 5A is a front view showing a rotary switch in detail.
FIG. 5B is a side view showing the rotary switch in detail.
Figure 6:
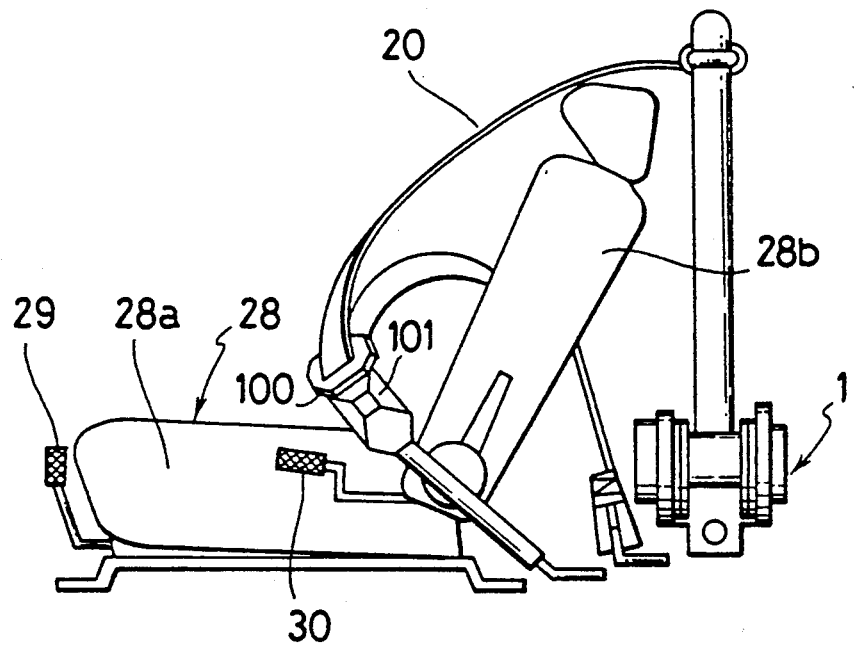
FIG. 6 is an explanatory view of a seat belt retractor in a working state.

FIG. 1A is an exploded perspective view of mainly a mechanical system of a seat belt system as an embodiment of the present invention. FIG. 1B is a front view of the system, with portions broken away, in an assembled state. FIGS. 2A and 2B are front and rear views of a gear hold. FIG. 3 is an explanatory view of a gear plate. FIG. 4 is a circuit diagram of mainly an electric system of the seat belt system. FIGS. 5A and 5B are front and side views showing a rotary switch in detail. FIG. 6 is an explanatory view in a working state.

The emergency locking seat belt retractor 1 shown in FIGS. 1A and 1B is mainly of a mechanical system of the present seat belt system and comprises a body 2 which section is U-shaped.

The body 2 has a shaft (also referred to as a reel shaft) 3 which fixes one end portion of a seat belt 20 and which is rotatably disposed. An axial slit 3b is formed at one end portion 3a of the shaft 3. A well-known emergency lock device 40 is attached to the other end portion of the shaft 3.

A retainer 4 is attached to one end portion of the body 2 by an appropriate means such as screwing. The one end portion 3a of the shaft 3 protrudes over a through hole 4a formed in the middle of the retainer 4. A gear plate 5 is engaged with and fixedly attached to a portion of a large diameter 3c of the shaft 3. A notch 300 is disposed at the portion of a large diameter 3c in the direction of the chord. As the notch 300 engages with a stage position (not shown) of the inside circumference surface of the hole in an axis of the gear plate 5 in the direction of the chord, the gear plate 5 and the shaft 3 always rotate integrally.

The gear plate 5 comprises internal teeth 5a, a notch portion 5b which puts a hook 14 in it, which hook 14 will be described later, and an axis portion 5c protrudingly formed in the middle portion.

A central hole of a gear hold 8 is rotatably engaged with the axis portion 5c. As shown in detail in FIGS. 2A and 2B, external teeth 8a are formed at the external circumference surface of the gear hold 8 and a circular concave portion 8b for putting a memory spring 10 which will be described later and a catching portion 8e for catching the external circumference end of the memory spring 10 are disposed at one side face of the gear hold 8. A support axis 8c to support an idle gear 9 and a protruding portion 8d which is protrudingly formed on the internal circumference surface so as to engage with the hook 14 which is put in the gear plate 5 are formed at the other side face of the gear hold 8. The gear hold 8 is structured so that the internal surface of its external portion may cover the gear plate 5.

A partial teeth gear 16 having teeth 16a which teeth 16a are formed on a part of its side face and engaged with the teeth 8a formed on the external circumference surface of the gear hold 8 can rotate either in a normal direction or in the opposite direction by a drive 18. The drive 18 is fixedly attached to the body 2.

The drive 18 comprises a motor 15 which can rotate either in a normal direction or in the opposite direction and which can lock the gear hold 8 and a deceleration mechanism portion 17 which decelerates and transmits the rotation of the motor 15 to a rotation axis 19. In the present invention, the deceleration mechanism portion 17 comprises a worm gear and therefore, the rotation of the motor 15 makes the rotation axis 19 rotate but force given by the partial teeth gear 16 does not make the rotation axis 19 rotate and the rotation axis 19 remains being stopped.

The partial teeth gear 16 and a contactor 19a are attached to the open end of the rotation axis 19. A rotary switch board 23c of a rotary switch which will be described later is fixedly attached so as to face the partial teeth gear 16 and so as to be on the opposite side to the body 2 in respect of the partial teeth gear 16.

The memory spring 10 is put in the concave portion 8b of the gear hold 8. The external circumference end 10a of the memory spring 10 is caught in the catching portion 8e of the gear hold 8. The internal circumference end 10b of the memory spring 10 is caught in the slit 3b of the shaft 3. A spring cap 11 engaged so that the memory spring 10 may not move out of the side face of the gear hold 8 also functions as a dividing board between a return spring 12 and the memory spring 10.

The return spring 12 is put in a spring container 13a of a cover 13 fixedly attached to the body 2 through screws, etc. The external circumference end 12a of the return spring 12 is caught in the cover 13. The internal circumference end 12b is caught in the slit 3b of the shaft 3.

As shown in FIG. 3, the hook 14 is rotatably disposed at the notch 5b of the gear plate 5 through the support axis 14a.

The hook 14 is always biased in the direction so that the free end of the hook may move toward the axis portion 5c by a hook spring 39, one end 39a of which is fixed to the notch 5b of the gear plate 5. The hook 14 comprises a protruding portion 14b which is in contact with a protruding portion 9a of the idle gear 9 (See FIG. 1A) on the internal face side facing the shaft 3. The hook 14 is supported by the spring 39 so that the tip face of the protruding portion 14b of the hook 14 may not protrude over the tip face of the internal teeth 5a of the gear plate 5 and the tip face of the protruding portion 14b may generally be flush with the tip face of the internal teeth 5a.

Figure 7A:
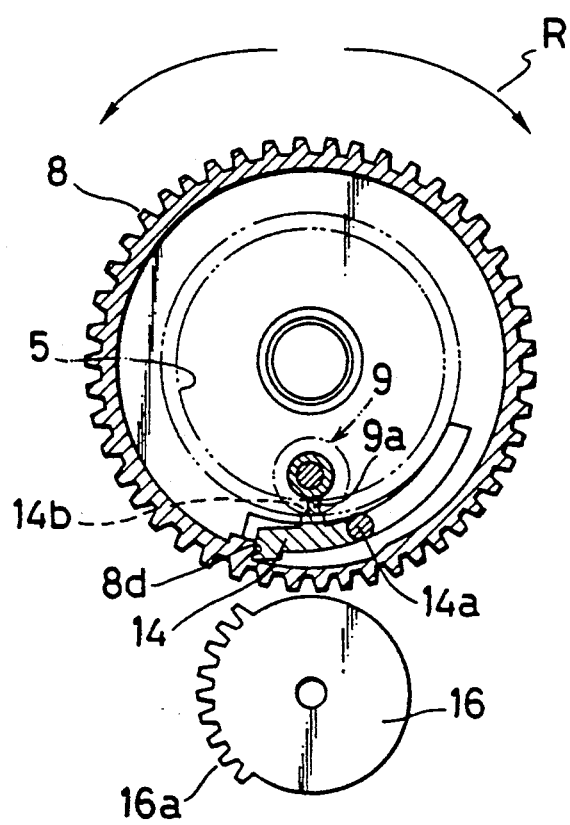
FIGS. 7A, 7B, 7C, 7D, and 7E are explanatory views showing mainly the state of engagement of the gear hold with a partial teeth gear.

When the protruding portion 14b of the hook 14 is engaged with the protrusion 9a of the idle gear 9 and the tip of the hook 14 is pushed out from the external circumference of the gear plate 5, as shown in FIG. 7a, the protruding portion 8d of the gear hold 8 engaged with the hook 14 and prevents the gear hold 8 and the gear plate 5 from relatively rotating in one direction.

Next, mainly the electric system of the present system will be described with reference to FIG. 4.

The circuit shown in FIG. 4 comprises the motor 15 as abovementioned, the contactor 19a which rotates integrally with the partial teeth gear 16, and the rotary switch board 23c as abovementioned. The circuit is provided with a rotary switch 23 which changes the direction of the rotation of the motor 15, a buckle switch 24 which detects that a tongue 100 is inserted in a buckle 101, a detection switch for seat 26 as a seat detection means for detecting the condition of the seat, a motor breaker switch 27, a relay 21 comprising an electromagnetic portion 21a and a movable armature portion 21b in which armatures 21c through 21e can be switched depending on the state of electricity in relation to the electromagnetic portion 21a (in the Figs., NOs show contacts which are normally on and NCs show contacts which are normally closed), and a timer 22 by which the time until the beginning of the actuation (delay time) of the relay 21 is set and which is set or reset by the detection switch for seat 26.

Among these elements, in the present embodiment, the rotary switch 23, the motor 15, the partial teeth gear 16, and the relay 21 play a role which is to get the seat belt retractor 1 to be in the tensile force giving mode for a time according to the result of the detection of the seat detection means (detection switch for seat 26) and which is to get the seat belt retractor 1 to be in the tensile force cancel mode after a predetermined time with an appropriate slack of the seat belt 20. In the present embodiment, the abovementioned functions are realized by the rotary switch 23, the motor 15, the partial teeth gear 16, and the relay 21, etc., but a program which actuates the abovementioned functions and a microcomputer which carries out each of the abovementioned functions according to the program, etc. may also be applied.

The detection switch for seat 26 comprises a seat displacement detection switch 26a (not shown) which is attached to a slide lever and a reclining lever of a seat and detects the operation of each of the levers, which levers will be described in detail later, and a sitting posture change detection switch 26b (not shown) which is attached to a seat portion and a seat back portion of a seat and detects a change in the sitting posture of an occupant.

In the present embodiment, the detection switch for seat 26 comprises both of the seat displacement detection switch 26a and the sitting posture change detection switch 26b, but the detection switch for seat 26 may comprise only one of the seat displacement detection switch 26a and the sitting posture change detection switch 26b.

Next, the rotary switch 23 will be described.

The rotary switch 23 shown in FIG. 5 comprises a rotary switch board 23c having conductive members 23a and 23b which members are formed concentrically and overlaps within a range of a predetermined angle, and the contactor 19a which rotates no contact with the conductive members 23a and 23b. The abovementioned electric system is structured so that the motor 15 may rotate in a normal direction (clockwise) when the contactor 19a is within a range shown as A in FIG. 4, that is, in contact with only the conductive member 23a, and so that the motor 15 may rotate in the reverse direction when the contactor 19a is within a range shown as B in FIG. 4, that is, in contact with only the conductive member 23b.

FIG. 6 shows an example of providing in the inside of a vehicle the abovementioned seat belt system. A seat 28 comprises a seat portion 28a and a seat back portion 28b.

The position of the seat portion 28a in the direction to the front or to the rear (in right or left direction in the Fig.) is adjusted by a slide lever 29. The inclination of the seat back portion 28b is adjusted by a reclining lever 30. The seat displacement detection switch 26a is linked with each of the levers 29 and 30 to have the timer 22 set or reset.

The sitting posture change detection switch 26b is disposed at the seat portion 28a and/or seat back portion 28b of the seat 28. The sitting posture change detection switch 26b detects change in the sitting posture of an occupant and is actuated to set or reset the timer 22.

Next, the functions of the seat belt system will be described with reference to FIG. 4, and in addition, to FIGS. 7A through 7E.

State when the seat belt is wound

Figure 7B:
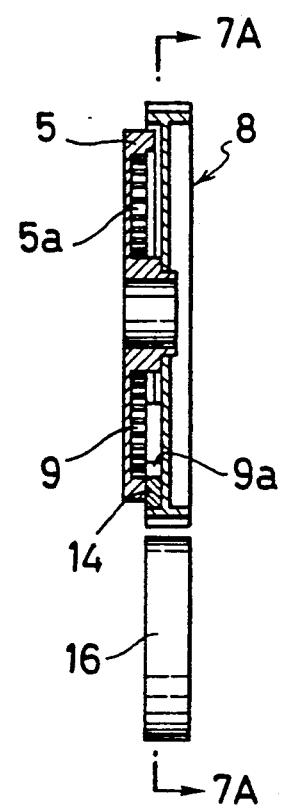
Figure 7E:
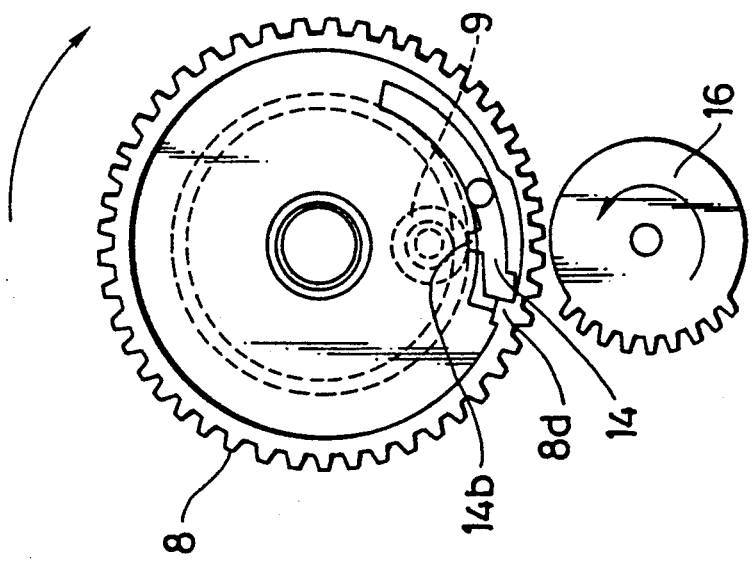

In this state, as shown in FIGS. 7A and 7B, the motor 15 is suspended in a position so that the gear hold 8 may not be engaged with the partial teeth gear 16.

In this state, the protrusion 9a of the idle gear 9 is engaged with the protruding portion 14b of the hook 14 and makes the hook 14 protrude outward. The tip face of the hook 14 is engaged with the protruding portion 8d of the gear hold 8. By this, the gear hold 8 can not rotate in the direction of unwinding or retracting the seat belt 20 with respect to the gear plate 5 but can rotate in the direction of winding the seat belt 20 with respect to the gear plate 5.

State when the seat belt is unwound

When the seat belt 20 is unwound or retracted, the gear plate 5 fixedly attached to the reel shaft 3 rotates.

At this time, as this rotation force is also transmitted to the gear hold 8 through the memory spring 10, the gear hold 8 rotates together with the gear plate 5.

Next, when the tongue is inserted in and engaged with the buckle, the buckle switch 24 (See FIG. 4) in the buckle is turned on. By the ON state of the buckle switch 24, the timer 22 is set or activated.

After this engagement is made, if the occupant leaves the seat belt 20, the reel shaft 3 and the gear plate 5 rotates in the direction of winding the seat belt by the return spring 12. Then, as the hook 14 is engaged with the protruding portion 8d, according to the rotation of the shaft 3 in the direction of winding the seat belt, the gear hold 8 as well as the gear plate 5 rotates at the same time.

Accordingly, after the engagement of the buckle, the slack of the seat belt 20 is wound to the seat belt retractor until the seat belt 20 fits the occupant.

State in the tensile force cancel mode (hereinafter also referred to as "tensionless state")

When a time set by the abovementioned timer 22 passes since the seat belt 20 was made to fit the occupant, the electricity is turned on in relation to the electromagnetic portion 21a of the relay 21 and each of the armatures 21c through 21e of the movable armature portion 21b are switched from the initial state to the state shown in dotted lines of FIG. 4. By this, the electricity is turned on in relation to the motor 15 through the conductive member 23a and the armatures 21c and 21e and the motor 15 rotates in the normal direction, and by this, the partial teeth gear 16 is rotated in the direction of an arrow shown in FIG. 7C. At the same time, the contactor 19a (shown in FIG. 4) is rotated clockwise and moves from within the range shown as A to within the range shown as B (shown as 19a') in FIG. 4. When the contactor 19a is moved within the range shown as B, the rotation of the motor 15 is stopped.

Figure 7D:
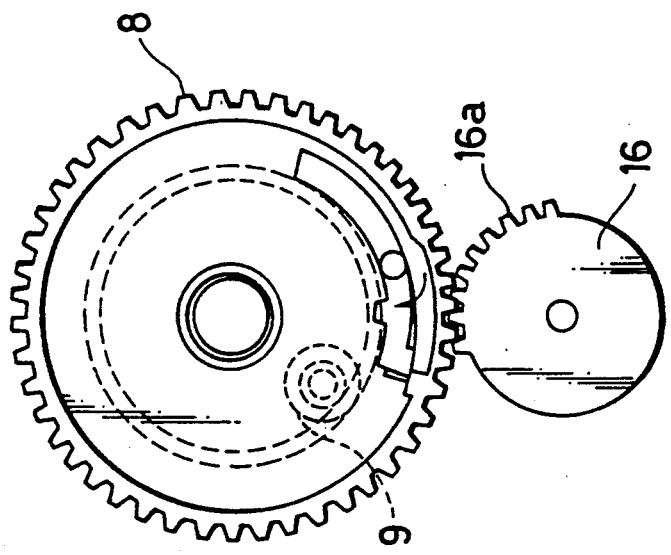

By the rotation of the motor 15, the partial teeth gear 16 is engaged with the gear hold 8, makes the gear hold 8 rotate by a predetermined angle and stops with the engaged state, by which the rotation of the gear hold 8 is locked. Because the motor 15 is a worm type one, the motor 15 locks the gear hold 8 by way of the partial teeth gear 16. When the gear hold 8 is locked, the gear plate 5 is prevented to rotate in the direction of winding the seat belt because the hook 14 is engaged with the protruding portion 8d, thereby the reel shaft 3 is prevented to rotate in the direction of winding the seat belt. In this way, by locking the motor 15, the rotation of the reel shaft 3 in the direction of winding the seat belt is prevented and locked. During the period from the time when the gear hold 8 begins to be engaged with the partial teeth gear 16 to the time when this stopped state is accomplished, the gear hold 8 rotates in the direction of unwinding the seat belt. According to this rotation, the gear plate 5 also rotates in the direction of unwinding the seat belt (because the hook 14 is engaged with the protruding portion 8d). By this, the seat belt is unwound by a small amount of length and a slack is given. The rotation of the gear hold 8 by a predetermined angle caused by the partial teeth gear 16 unwinds the seat belt 20. After an appropriate slack is given, the movement of the seat belt 20 is locked and the tensionless state is maintained. After that, the movement is within the range of a memory of the tensionless position which are described later (FIG. 7D).

State when the seat is displaced

When a portion of the seat 28 is displaced, for example, the seat portion 28a is slided backward, the seat back portion 28b is reclined, or the seating posture of an occupant is changed, after the buckle is engaged, such displacement is detected by the detection switch for seat 26 (See FIG. 4). By the displacement of the seat 28, each of the armatures 21c through 21e of the movable armature portion 21b returns to the initial state shown in FIG. 4, and at the same time, the timer 22 is reset and a set time is set again.

By this, the electricity is turned on in relation to the motor 15 through the conductive member 23b and armatures 21d and 21e and the motor 15 rotates in the opposite direction. At the same time, the contactor 19a (shown in FIG. 4) is integrally rotated counterclockwise in the Fig. and moves from within the range shown as B to within the range shown as A. When the contactor 19a is moved within this range shown as A, the rotation of the motor 15 is stopped. At the same time, according to the rotation of the motor 15 in the opposite direction, the partial teeth gear 16 rotates, in the direction of winding the seat belt 20 and returns to the state when the partial teeth gear 16 is not engaged with the gear hold 8 (See FIG. 7E). With the abovementioned operation, the tensionless state of the seat belt 20 is for a time cancelled and the emergency locking seat belt retractor 1 is in the tensile force giving mode.

The reset operation of the timer 22 is made when a sliding operation of the seat portion 28a backward is followed by a change of the reclining angle of the seat back portion 28b or a change of the seating posture. Also, when the seat 28 is displaced in the reverse order, the reset operation of the time is made according to each operation.

Figure 7C:
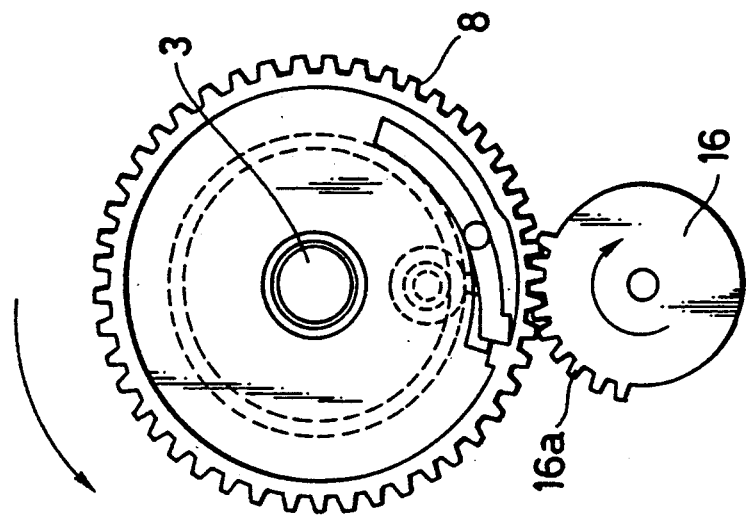

Again, when the time set to be delayed passes, the electricity is turned on in relation to the electromagnetic portion 21a, wherein each of the armatures 21c through 21e of the movable armature portion 21b is switched from the initial state shown in FIG. 4, the motor 15 is rotated in the normal direction, and thus the partial teeth gear 16 is rotated in the direction of the arrow shown in FIG. 7C. At the same time, the contactor 19a (shown in FIG. 4) is integrally rotated clockwise in the Fig. and again moves from within the range shown as A to within the range shown as B in the FIG. 4 (shown as 19a'). The seat belt 20, after an appropriate slack by the rotation of the gear hold 8 is provided by a predetermined angle caused by the partial teeth gear 16, becomes tensionless.

By the abovementioned operation, the emergency lock system seat belt retractor 1 is for a time in the tensile force giving mode by a signal from the seat detection means 26, winds the seat belt 20 so that the seat belt 20 may fit on the body of an occupant, unwinds the seat belt 20 by a predetermined length after a predetermined time (delay time) and gives an appropriate slack to the seat belt 20 to provide tensile force release mode.

Memorizing a tensionless position

Next, memorizing operation of a tensionless position is described also with reference to FIG. 7D.

The position where the rotation of the reel shaft 3 in the direction of winding the seat belt 20 is locked (when the teeth 16a of the gear with partial teeth is engaged with the external teeth 8a of the gear hold 8) is the memorized tensionless position.

When the seat belt 20 is unwound or retracted by a forward movement of the occupant such as a forward-bent posture of the occupant from the memorized position, the reel shaft 3 rotates while tightening the windings of the return spring 12 and the memory spring 10. As the gear hold 8 is locked by the motor 15, the gear hold 8 does not rotate. The gear plate 5 fixed to the reel shaft 3 can not rotate in the direction of winding the belt as the hook 14 is engaged with the gear hold 8. However, as the gear plate 5 can rotate in the direction of unwinding the belt, the gear plate 5 rotates in the direction of unwinding the belt. By the rotation of the gear plate 5, the idle gear 9 engaged with the internal teeth 5a of the plate 5 rotates with the support axis 8c of the locked gear hold 8 as its supporting point. Then, the engagement of the protrusion 9a of the idle gear 9 with the protrusion 14b of the hook 14 is released, and the tip of the hook 14 is put in the inside of the gear plate 5 by the biased force of the hook spring 15 (FIG. 7D).

By this, the engagement of the protrusion 8d of the inside of the gear hold 8 with the hook 14 is released. Accordingly, the gear plate 5 is completely free from the gear hold 8 and rotates together with the shaft 3 in the direction of winding/unwinding the belt. At this stage, winding or unwinding the belt 20 can be freely done.

Next, when the occupant returns to the former posture again, the seat belt 20 is wound by the same length as what was unwound. Then, the protrusion 9a of the idle gear 9 is once again engaged with the protrusion 14b of the hook 14, the hook 14 is pushed out, and the hook 14 come to contact with the protrusion 8d of the gear hold 8. At the stage when this contact occurs, the gear plate 5 (that is, the shaft 3) is prevented from rotating further in the direction of winding the belt, and the seat belt 20 becomes tensionless. In other words, the moving range (distance) of the idle gear 9 which occurs when the protrusion 9a of the idle gear 9 is released from the engagement with the protrusion 14b of the hook until the both are engaged with each other is the range in which the occupant can move his own body freely to the front or the rear.

According to the embodiment of the system which is described in detail above, the pressed feeling due to the seat belt 20 can be eliminated, and at the same time, the question that an abnormal slug occurs and the binding effect is lowered accordingly can be eliminated which question arises from adjusting the angle of the seat back portion 28b, adjusting by moving the seat portion 28a, an action of the occupant from a forward-bent posture to a posture fully sitting in the seat back portion 28b, etc.

The present invention is not limited to the abovementioned one embodiment and various modifications within the true spirit of the invention are possible.

FIGS. 8A and 8B are a front view with portions broken away and an end view taken along the line A—A of FIG. 8A, respectively, of an emergency locking seat belt retractor of a seat belt system as another embodiment. In the Figs., like reference characters designate like parts which are described in the embodiment already described and description thereof is omitted.

The main difference in the emergency locking seat belt retractor shown in the Figs. from that already described is that it comprises a large spur gear 35 fixed to one end portion of the shaft 3, a small spur gear 38 which is engaged with the large spur gear 35, an electromagnetic clutch 31 which connects or disconnects the output of the deceleration mechanism portion 17 with the small spur gear 38, a gear hold 34 on the external circumference surface of which a ratchet 34a is formed, a generally L-shaped catching member 33 supported by its axis so that a pawl portion 33b of the catching member 33 may be able to catch the ratchet 34b, an electromagnetic solenoid 32 which can be switched to a magnetized/demagnetized state according to the ON/OFF state of the buckle switch 24 and thus can sway or move the catching member 33 around the axis 33a, and a rotation actuation sensor plate 36. In the present embodiment, a timer (not shown) is provided in the electric system which timer makes the electromagnetic solenoid 32 in the OFF state (demagnetized state) for a time according to a detection signal from the detection switch for seat 26, and after a delay for a predetermined length of time, makes again the electromagnetic solenoid 32 in the ON state (magnetized state).

At the end of the movement of the catching member 33, a tooth switch 41 which switches the ON/OFF state of the motor 15 and the electromagnetic clutch 31 is provided. The ON/OFF state of the tooth switch 41 is switched according to the state of the sway of the catching member 33. When the pawl portion 33b of the catching member 33 is not engaged with the ratchet 34a of the gear hold 34, the tooth switch 41 is in the ON state, that is, the motor 15 is driven to rotate and the electromagnetic clutch 31 is in the state of transmitting the driving force of the motor 15. On the other hand, when the pawl portion 33b of the catching member 33 is engaged with the ratchet 34a of the gear hold 34, the tooth switch 41 is moved to the OFF state, that is, the rotation of the motor 15 is stopped and the electromagnetic clutch 31 is in the state of non-transmitting the driving force of the motor 15.

The rotation actuation sensor plate 36 is rotatably supported by its axis adjacent to the pawl portion 33b of the catching member 33. The rotation actuation sensor plate 36 is normally urged clockwise by an encouraging member 37 and is attached so as to get in contact with the side face and the lower portion of the reel shaft 3. The rotation actuation sensor plate 36 has a function to prevent the pawl portion 33b of the catching member 33 from being engaged with the ratchet 34a of the gear hold 34, and when the seat belt 20 is unwound, it moves away from the side face and the lower portion of the reel shaft 3 and permits the pawl portion 33b of the catching member 33 to be engaged with the ratchet 34a of the gear hold 34.

The operation of a seat belt system comprising the above elements is described.

When the tongue is inserted in and engaged with the buckle, the buckle switch 24 is turned on.

By this, the electromagnetic solenoid 32 is changed to the ON state (magnetized state) and tries to rotate the catching member 33 counterclockwise in the Fig. However, the rotation actuation sensor plate 36 prevents the pawl portion 33b of the catching member 33 from being engaged with the ratchet 34a of the gear hold 34 and the tensionless state does not occur. On the other hand, as the tooth switch 41 is in the ON state, the motor 15 is driven to rotate and the electromagnetic clutch 31 transmits the driving force to the small spur gear 38. By this, the large spur gear 35 rotates and the seat belt 20 is unwound by a predetermined amount.

By the unwinding of the seat belt 20, the rotation actuation sensor plate 36 moves away from the side face and the lower portion of the reel shaft 3 and permits the pawl portion 33b of the catching member 33 to be engaged with the ratchet 34a of the gear hold 34. The pawl portion 33b of the catching member 33 is engaged with the ratchet 34a of the gear hold 34 and the seat belt 20 becomes tensionless (See FIG. 8C). Also, by the engagement of the pawl portion 33b of the catching member 33 with the ratchet 34a of the gear hold 34a, the tooth switch 41 is turned off, the motor 15 is stopped, and the electromagnetic clutch 31 is in the state of non-transmitting the driving force of the motor 15.

In this tensionless state, when the seat is displaced as abovementioned, this displacement is detected by the detection switch for seat 26 and a signal according to the displacement of the seat 28 is sent out. By the signal, the electromagnetic solenoid 32 is demagnetized, the engagement of the pawl portion 33b of the catching member 33 with the ratchet 34a of the gear hold 34 is released, the tensionless state is released, and the seat belt is wound. At the same time, a timer (not shown) is set which makes the electromagnetic solenoid 32 and the tooth switch 41 in the ON state (magnetized state) for a time after a delay for a predetermined length of time according to the detection signal from the detection switch for seat 26, and after the set delay time (predetermined time) passes, the electromagnetic solenoid 32 is again in the ON state and similarly as abovementioned, the seat belt 20 becomes tensionless.

By the above operation, the emergency locking seat belt retractor is changed to the tensile force giving mode for a time by a signal from the detection switch for seat 26 and the seat belt 20 is wound, and after a predetermined time (delay time), the emergency lock system seat belt retractor is in the tensile force cancel mode with an appropriate slack of the seat belt 20 made by unwinding the seat belt by a predetermined length.

A seat belt system structured as above also has the same effect as the former embodiment.

Further, the seat belt system shown in FIGS. 1A and 1B may have a sensor, etc. which detects the vibration of a shock absorber of the car body to detect the vibration of the car body when driven on a bad road or a sensor to detect the acceleration when braked suddenly, and the tensionless state of the seat belt 20 may be released and wound by the output of these through the motor 15 and the partial teeth gear 16 so that the occupant may be restrained to the seat 28 by the seat belt 20.

According to the present invention as detailedly described above, a seat belt system can be provided with a tensionless function with which an appropriate slack is always given without an excessive slug.

What is claimed is:

1. A seat belt system for protecting an occupant inside a vehicle by a seat belt, comprising:
an emergency locking seat belt retractor for selectively setting a tensile force giving mode to provide tensile force to the seat belt and a tensile force cancel mode to cancel the tensile force, and
seat detection means for detecting at least one of sliding of a seat, changing of a reclining angle and changing of posture of the occupant, said seat belt retractor, based on a signal from the seat detection means, providing for a time the tensile force giving mode and after predetermined time, changing to the tensile force cancel mode to provide a predetermined slack of the seat belt, said seat belt retractor including;

a retractor body, a reel shaft for winding the seat belt and rotationally situated in the retractor body, said reel shaft having a side portion protruding from the retractor body, a gear plate fixed to the reel shaft and having internal teeth and an external circumference, a disk-shaped gear hold having a central hole, external teeth at an external circumference thereof, and a support axis at a side face thereof, said central hole being rotationally situated over the reel shaft, a cover attached to the retractor body to cover the gear plate and the gear hold, a spiral return spring connected between the cover and the reel shaft for biasing the reel shaft to rotate in a belt-winding direction, a spiral memory spring connected between the gear hold and the reel shaft to urge the reel shaft to rotate in the belt-winding direction relative to the gear hold, an idle gear rotatably supported by the support axis of the gear hold, said idle gear having teeth and a protruding portion both formed at an external circumference thereof, said teeth engaging the internal teeth of the gear plate, a hook having a base end side and a tip side, said base end side being rotatably supported at a peripheral portion of the gear plate and said tip side being able to protrude outwardly and to retreat inwardly from the external circumference of the gear plate, said hook being able to engage with the protruding portion of the idle gear, said tip side, when the hook it engaged with the protruding portion, protruding over the external circumference of the gear plate, a hook spring for urging the tip side of the hook inwardly from the external circumference of the gear plate, a protruding portion formed at the gear hold, said protruding portion engaging the tip side of the hook when the tip side of the hook protrudes over the external circumference of the gear plate, said protruding portion and the hook being arranged such that the gear hold may rotate freely in the belt-winding direction and the protruding portion may contact with the hook when the gear hold rotates in a belt-unwinding direction, a partial teeth gear having partial teeth at an external circumference thereof, said partial teeth engaging the external teeth of the gear hold, and drive means for operating the partial teeth gear, said drive means having a stop position for locking the gear hold by force transmitted from the partial teeth gear, wherein when the partial teeth gear rotate such that the teeth of the partial teeth gear and the external teeth of the gear hold shift from a non-engagement state to an engagement state, the gear hold is rotated in the belt-unwinding direction for a predetermined small angle and the gear plate together with the reel shaft is rotated in the direction of unwinding the seat belt for a predetermined small angle to thereby allow the seat belt to extend outwardly for a predetermined amount, when the partial teeth gear stops in the non-engagement state, the gear hold is locked by the drive means, and the gear plate and the reel shaft are prevented from rotating in the belt-winding direction to provide a tensile force cancel mode, and in the tensile force cancel mode, when the partial teeth gear is rotated in the non-engagement state, the gear hold becomes to rotate freely, and the reel shaft is urged by the return spring to rotate in the belt-winding direction to provide the tensile force giving mode.

2. A seat belt system for protecting an occupant inside a vehicle by a seat belt, comprising:

an emergency locking seat belt retractor for selectively setting a tensile force giving mode to provide tensile force to the seat belt and a tensile force cancel mode to cancel the tensile force, and seat detection means for detection at least one of sliding of a seat, changing of a reclining angle and changing of posture of the occupant, said seat belt retractor, based on a signal from the seat detection means, providing for a time the tensile force giving mode and after predetermined time, changing to the tensile force cancel mode to provide a predetermined slack of the seat belt, said seat belt retractor including;

a retractor body, a reel shaft for winding the seat belt and rotationaly situated in the retractor body, said reel shaft having a side portion protruding from the retractor body, a gear connected to the reel shaft, a motor having a clutch, said motor being connected to the gear through the clutch to rotate the same, a gear hold connected to the reel shaft and having a ratchet therearound, a catching member pivotally attached to the retractor body, said catching member being able to engage the ratchet of the gear hold to prevent the reel shaft from rotating in a belt-winding direction, actuating means for moving the catching member, a rotation actuation sensor pivotally attached to the catching member to prevent the catching member to engage the ratchet of the gear hold, a tooth switch for switching on/off condition of the motor, said tooth switch being actuated by the catching member, a cover attached to the retractor body to cover the large and small gears, and a spiral return spring connected between the cover and the reel shaft for biasing the reel shaft to rotate in the belt-winding direction, wherein when the seat belt is worn by the occupant, the tooth switch is actuated to rotate the motor so that the gear is rotated in the direction of unwinding the seat belt for a predetermined small angle to thereby allow the seat belt to extend outwardly for a predetermined amount, when the gear is rotated in a belt-unwinding direction, the rotation actuation sensor is actuated to allow the catching member to engage with the ratchet of the gear hold and the motor is stopped by the tooth switch so that the reel shaft is prevented from rotating in the belt-winding direction to provide the tensile force cancel mode, and in the tensile force cancel mode, when the seat detection means is actuated, the actuating means is released to disengage the catching member from the ratchet and the reel shaft is urged by the return spring to rotate in the belt-winding direction to provide the tensile force giving mode.

* * * * *

UNITED STATES PATENT AND TRADEMARK OFFICE
CERTIFICATE OF CORRECTION

PATENT NO. : 5,087,075
DATED : February 11, 1992
INVENTOR(S) : Tetsuya Hamaue It is certified that error appears in the above-identified patent and that said Letters Patent is hereby corrected as shown below:

Column 11, line 66-67, change "non-engagement" to --engagement--.

Signed and Sealed this

Twelfth Day of April, 1994

*Attest:*

BRUCE LEHMAN

*Attesting Officer*  *Commissioner of Patents and Trademarks*